United States Patent [19]
Robinson et al.

[11] 3,855,252

[45] Dec. 17, 1974

[54] LIQUID PHASE OXIDATION OF CONDENSED-RING AROMATIC HYDROCARBONS

[75] Inventors: Kenneth R. Robinson, Russell; Joseph E. Willis, Ashland, both of Ky.

[73] Assignee: Ashland Oil, Inc., Ashland, Ky.

[22] Filed: Sept. 15, 1971

[21] Appl. No.: 180,228

Related U.S. Application Data

[63] Continuation of Ser. No. 744,768, July 15, 1968, abandoned.

[52] U.S. Cl............................ 260/385, 260/590
[51] Int. Cl............................ C07c 49/68
[58] Field of Search................. 260/385, 590, 396

[56] References Cited
UNITED STATES PATENTS

| | | | |
|---|---|---|---|
| 2,859,247 | 11/1958 | Radzitky............................ | 260/590 |
| 3,038,940 | 6/1962 | Serres et al........................ | 260/590 |
| 3,458,538 | 7/1969 | Mahoney........................... | 260/385 |

FOREIGN PATENTS OR APPLICATIONS

| | | | |
|---|---|---|---|
| 2,013,015 | 3/1970 | France............................... | 260/385 |

OTHER PUBLICATIONS

Sbornik Statei Obshchei Khim., Vol. 2, pp. 1091–1095, (1953).
Chemical Abstracts, Vol. 64, p. 667 f., (1966).
Chemical Abstracts, Vol. 64, p. 19354 e., (1966).
Chemical Abstracts, Vol. 71, p. 112145y, (1969).

*Primary Examiner*—Lorraine A. Weinberger
*Assistant Examiner*—Patrick J. Hagan
*Attorney, Agent, or Firm*—Walter H. Schneider

[57] ABSTRACT

A process for oxidizing condensed-ring aromatic compounds, selected from the group consisting of anthracene, anthracene derivatives, fluorene, fluorene derivatives, mixtures of these materials with one another, and mixtures of these materials with other compounds, to produce the corresponding oxygenated compounds; including, forming a solution or slurry of the condensed-ring aromatic compound in a solvent, containing at least one lower carboxylic acid or mineral acid, such as, acetic acid; and contacting the solution or slurry with a catalyst of at least one heavy metal salt, such as manganese acetate or cobalt acetate, preferably, in combination with a bromine compound, such as potassium bromide, while blowing with air and maintaining a temperature of about ambient to 400°F. at a pressure of about atmospheric to 800 psig. The process is particularly useful in the nuclear oxidation of anthracene contained in a crude middle oil fraction of coal liquids which have been preliminarily subjected to distillation to remove materials boiling below anthracene, to reduce the carbazole content to less than about 10% by removing a fraction boiling above anthracene and to recover an anthracene fraction which also contains substantial quantities of phenanthrene. The low boiling material alone or together with the high boiling fraction is preferably converted to carbon black.

9 Claims, 1 Drawing Figure

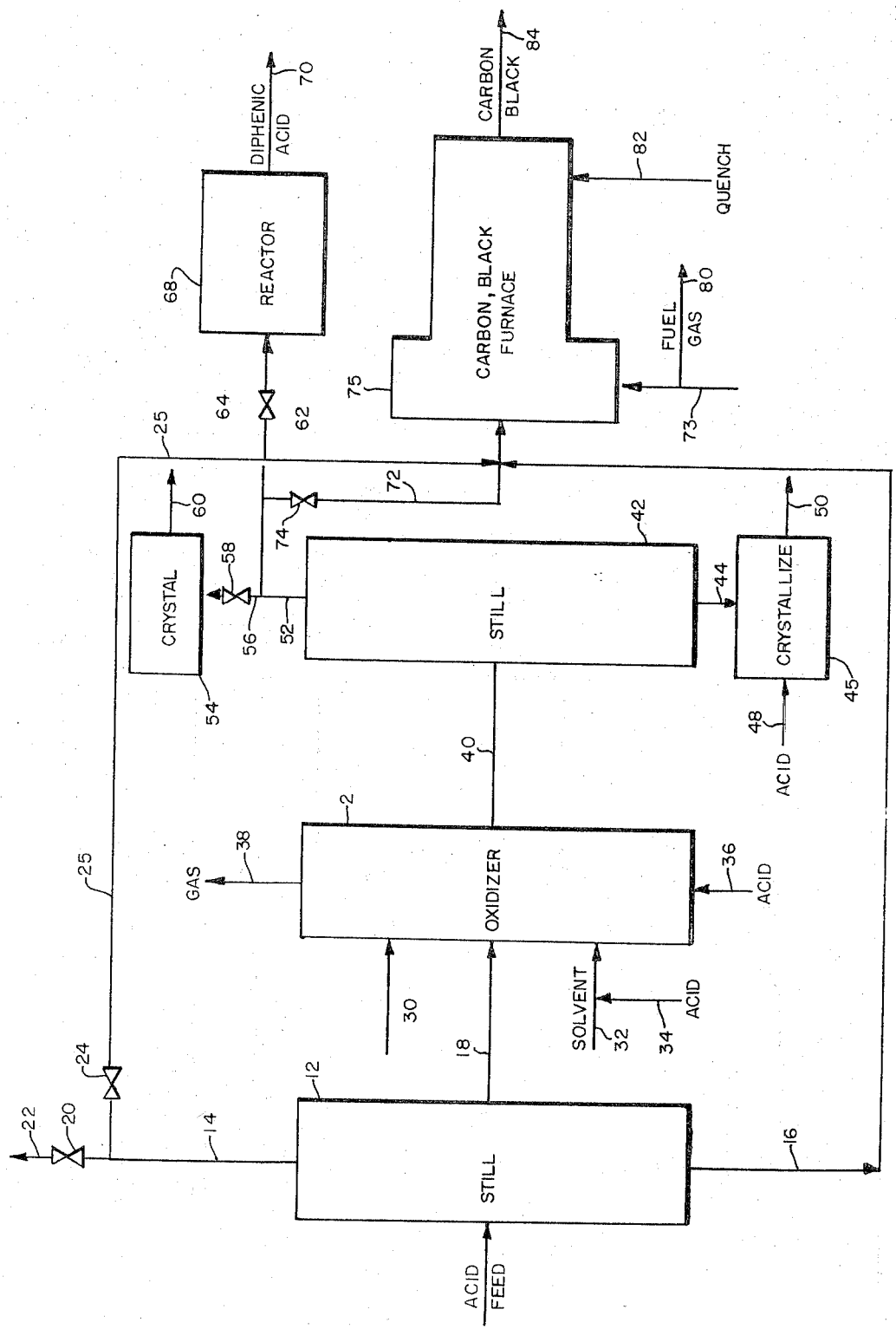

LIQUID PHASE OXIDATION OF CONDENSED-RING AROMATIC HYDROCARBONS

CROSS REFERENCES TO RELATED APPLICATIONS

This is a continuation application of copending application, Ser. No. 744,768, filed July 15, 1968, now abandoned.

BACKGROUND OF THE INVENTION

Condensed-ring aromatics such as, anthracene, anthracene derivatives, fluorene and fluorene derivatives, particularly anthracene, have long been a valuable item of commerce. These materials are primarily used for the preparation of oxidized products, such as, anthraquinone, which, in turn, is an essential ingredient for the preparation of very stable dyes for the dye industry. Various derivatives of anthraquinone are also used in the production of hydrogen peroxide. While the condensed-ring aromatic starting materials can be synthesized from various materials, as can the oxidized derivatives thereof, such synthesis is a very costly source of these compounds. Therefore, the primary source of such starting materials is coal liquids produced by the solvent extraction or destructive distillation of carbonaceous materials, particularly coal. However, one of the difficulties of recovering these materials from coal liquids is that they are present in such extremely minute quantities and they are difficult to separate from one another and from contaminating materials of substantially similar properties and boiling points. For example anthracene is present in coal liquids in a volume of about 1.6% and fluorene is generally present in amounts of about 1.5%. Since anthracene boils at about 644°F., and fluorene at about 563°F., these materials are contained in fractions of the coal liquids boiling between about 340° and 700°F. Materials boiling below 340°F. are generally referred to as crude naphthas or light oils and comprise primarily benzene, toluene and xylene. Materials boiling above about 700°F. are generally referred to as pitch fractions. Numerous names have been applied to the intermediate boiling coal liquids, in the 340° to 700°F. range, such as, carbolic oil (cresylic acid), naphthalene fractions, cresote oil, anthracene oil, green oil and the like. More generically, the lighter portion is often referred to as a middle oil and the heavier portion a heavy oil. However, the initial boiling points and end points of these materials differ according to the naming author and, therefore, it is difficult to apply any particular appendage to these materials and be sure what fraction is referred to. Therefore, in the present application we will simply refer to the entire fraction containing anthrancene and fluorene as a "middle oil fraction" or a "middle cresote oil" boiling from about 340° to 700°F. The heavy oil portion of the middle oil fraction will be referred to as a "middle heavy cresote oil" boiling between about 500° and 7o0°F.

While a number of techniques have been suggested for the separation of anthracene and fluorene from these crude middle oil fractions, such separations are extremely complex and expensive. This is primarily due to the fact that processes such as fractional crystallization, solvent extraction and the like, which are expensive, must be used because of the presence of contaminating materials in the fraction which react and boil similarly. for example, anthracene has the same boiling point as phenanthrene (644°F.), and the phenanthrene is usually present in the total coal liquid in amounts of about 4%. Further, carbazole, boiling at 671°F., is also present and interferes with many of the separations and reactions of anthracene. Similarly, naphthols and like materials tend to contaminate fluorene and make its separation and/or reaction difficult.

There have also been a number of workable processes in the prior art for converting condensed-ring aromatics to their oxidized derivatives, in many cases without separating these compounds from their crude mixtures. However, many of these processes have features which detract from their feasibility for commercial utilization. For example, those prior art processes which require a solid oxidizing agent, as opposed to a gaseous oxidizing agent, such as, air or oxygen, are unattractive because of the cost of the solid oxidizing agent and the necessity of handling relatively large amounts of solid oxidizing agent with relation to the quantity of the product recovered. There are also those processes in which a starting material is maintained in a vapor phase during oxidation. These latter processes necessarily require very high operating temperatures and pressures and thus require more expensive processing equipment than is used in liquid phase operations. As previously indiacated, there are known processes for separating the starting materials from their crude mixtures and oxidation processes which are less expensive than the previously mentioned oxidations and advantageous for the oxidation of virtually pure starting material. In these cases, the large number of costly steps involved in the separation, plus the added steps of oxidation, make such processes highly undesirable.

Of the processes which utilize a crude condensed-ring aromatic mixture, there are those which convert the condensed-ring aromatic compound to its corresponding oxidation product and the extraneous materials to carbon dioxide and water, which are readily removed from the product. While these processes save the preliminary purification of the feed and the subsequent purification of the oxidation product, the intrinsic value of the extraneous materials is wasted. Such a process has, however, been suggested for the oxidation of mixtures of anthracene and phenanthrene derived from coal liquids in order to produce anthraquinone. For example, a middle oil fraction of coal liquids will generally be about 5 to 12% by volume of anthracene. However, this middle oil also contains phenanthrene, acenaphthene, pyrene, acridine and, particularly, carbazole. Further purification of the middle oil fraction to concentrate the anthracene can be done by known methods such as crystallization to form what is known and sold as "anthracene cake." Commercial anthracene cake contains about 90 to 95% anthracene but it recovers less than about 50% of the anthracene originally present in the middle oil fraction and crystallization is expensive when low product recoveries result. Either the middle oil fraction, containing anthracene, or the anthracene cake may be subjected to a catalytic, vapor phase oxidation such as that disclosed in U.S. Pat. No. 1,926,540. In this process, the crude anthracene is oxidized in the presence of a vanadium oxide catalyst. The anthracene is partially oxidized to convert it to anthraquinone and the phenanthrene, carbazole and other impurities are eliminated by complete oxidation to water and carbon dioxide. The ability of this process to completely oxidize the phenanthrene, carbazole and other inpurities, while only partially oxidizing anthracene, was explained on the basis that anthracene had a greater stability toward oxidation than phenanthrene and carbazole. Stated differently, it may be said that the phenanthrene and carbazole have a greater proclivity towards oxidation than the anthracene. A similar conclusion, that phenanthrene has a greater tendency to oxidation than anthracene, can also be inferred from the teachings of U.S. Pat. No. 2,898,350. In this patent, it is disclosed that mixtures of phenanthrene and anthracene may be oxidized with ozone to produce anthraquinone from the anthracene and a variety of substituted diphenyl compounds from the phenanthrene. The diphenyl compounds can be readily separated from the anthraquinone and may, by a variety of procedures, be converted to corresponding desirable oxidation products, such as diphenic acid.

In the present invention, the above mentioned difficulties of producing oxidation products of anthracene, anthracene derivatives, fluorene, and fluorene derivatives are overcome by a rather simple but highly effective departure from the prior art procedures. According to the present invention, a method is provided for selectively oxidizing anthracene, anthracene derivatives, fluorene, and fluorene derivatives, in the presence of contaminating materials, such as, phenanthrene, carbazole and the like, without any substantial conversion of such unoxidized contaminants. The above review of the prior art makes it quite surprising that this can be accomplished when such prior art clearly indicates that the reverse should be true and the present process is contrary to the teachings of those skilled in the art. When a condensed-ring aromatic mixture, such as, an anthracene and phenanthrene mixture, is oxidized according to the present invention, the resultant anthraquinone is readily separated from the unoxidized phenanthrene. Further, the intrinsic value of the phenanthrene is not wasted since the phenanthrene is substantially unconverted. Finally, the lower boiling fraction of middle cresote oil is utilized for the production of carbon black. These and other objectives and advantages of the present invention are accomplished as set forth in detail in the remaining portion of this specification when read in conjunction with the drawing.

SUMMARY OF THE INVENTION

Briefly, in accordance with the present invention, condensed-ring aromatic compounds selected from the group consisting of anthracene, anthracene derivatives, fluorene, and fluorene derivatives, are oxidized to produce their corresponding oxidation products by mixing the condensed-ring aromatic with a solvent, including at least one carboxylic or mineral acid to form a liquid phase, and contacting the liquid phase with a catalyst of a heavy metal, preferably, including bromine, while maintaining the pressure sufficient to maintain the liquid phase and a temperature between about ambient and 400°F.

DISCUSSION

The flow diagram of the drawing will be described with specific reference to the processing of a middle heavy creosote oil boiling between about 500° and 700°F. In accordance with FIG. 1, the middle heavy creosote oil is introduced through line 10 to distillation unit 12. In distillation unit 12, it is fractionated to recover a light overhead fraction comprising about 20% of the feed and boiling below about 630°F. This light fraction is discharged through line 14. A heavy bottoms fraction comprising about 35 to 40% of the feed material and boiling above about 680°F is discharged through line 16. A middle or heart-cut boiling between about 620 and 680°F is discharged through line 18. This heart-cut comprises about 40 to 50% of the original feed and typically contains about 18% anthracene, 70% phenanthrene, 3% carbazole and 9% other impurities. Distillation unit 12 is operated at pressure below atmospheric since anthracene is generally degraded to a considerable extent at atmospheric pressure. Accordingly, a pressure of about 100 to 150 mm. of mercury has been found to be desirable. The relatively high melting points of phenanthrene and anthracene mixtures preclude the use of significantly lower pressures. The column efficiency should be 30 to 35 theoretical trays at the operating temperature in order to remove most of the carbazole in the heavy bottoms fraction. Higher column efficiencies will effect a partial separation of phenathrene and anthracene, but cause problems in the condenser lines because of the melting point of antracene-rich fractions. In other words, at temperatures above about 212°F., the phenathrene acts as a solvent medium for the anthracene and may replace at least a part of the solvent material hereinafter discussed. The column may be packed with a stainless steel packing, saddles, beeds or similar packing. The light material from the top of column 12 may be withdrawn through valve 20 and line 22 for outside use. This material, after having anthracene, phenanthrene, carbazole and higher boiling materials removed therefrom, is an excellent wood preservative and may be utilized for essentially the same purposes as the so-called light creosote oils. Preferably, however, the light oil is passed through valve 24 and line 26 and is thereafter utilized for the production of carbon black, as will be pointed out hereinafter. The heart-cut or phenanthrene/anthracene fraction discharged through line 18 is charged to a batch type oxidizing unit 28. A suitable catalyst is also charged to oxidizer 28 through line 30. In addition, a solvent material is introduced to oxidizer 28 through line 32; and, as indicated, this solvent should also include a minimum quantity of acid, which may be introduced through line 34. Air is introduced through line 36 to reaction vessel 28 and is therein bubbled through the reaction mixture. The reaction is continued until essentially all of the anthracene is oxidized to anthraquinone. Under the stated conditions of the present process, oxygen is utilized in excess of the stoichiometric amounts required for oxidation of the anthracene. It appears that some oxygen is utilized in the oxidation of impurities; however, this has not been definitely confirmed. In any event, the oxidized impurity does not appear to affect either the separation of the anthraquinone and phenathrene nor the purity of the products. Oxidizer 28 is maintained at a temperature between about ambient temperature and 400°F and at a pressure between about atmospheric pressure and 800 psig. It appears that the efficiency of oxidation is substantially improved by stirring the reaction mixture during oxidation. The operating pressure is maintained with an ordinary back pressure regulator. A suitable temperature controller may also be utilized to regulate both heat input to the reaction vessel and internal cooling to compensate for the exothermic reaction of the oxidation. It has also been observed that the efficiency of the stirring or mixing enables one to lower the operating temperature and yet obtain equivalent yields of product at a much more rapid reaction rate. It is desirable that the oxidation be carried out under conditions such that the concentration of oxygen in the effluent gas stream should not exceed about 5%. This effluent gas is discharged through line 38. The liquid product of oxidizer 28 is discharged through line 40. The oxidation product discharged through line 40 is then passed to distillation on column 42 for separation of the anthraquinone from phenanthrene. This separation can be quite easily carried out since the difference between the boiling point of phenanthrene and anthraquinone is about 70°F. Therefore, a column having an efficiency of 10 to 15 theoretical trays at atmospheric pressure is adequate. Some char is formed in the oxidation which amounts to about 5% of the phenanthrene/anthraquinone product. This char is relatively light, quite brittle and readily removed from the distillation unit. Because of the presence of the char and unremoved catalysts, a batch distillation unit is preferred. The anthraquinone product is discharged through line 44. Further purification of the anthraquinone can be effected by recrystallization in crystallization unit 46, aided by acetic acid introduced through line 48. With acetic acid, it has been found that a single recrystallization stage is sufficient. Purified anthraquinone is discharged through line 50. A highly purified phenanthrene product is discharged from still 42 through line 52. This product may be recovered as such by passing it to crystallization unit 54 through line 56 and valve 58. The purified phenanthrene may be recovered through line 60. Alternatively, the phenanthrene may be withdrawn through valve 62 and line 64 and passed to reaction unit 68. In reaction unit 68, the phenanthrene can be converted to diphenic acid by ozonolysis, basic hydrolysis, and basic permanganate oxidation. Other oxidation products may also be produced by oxidation of the phenanthrene, including 9,10-phenanthrene epoxide 9,10-dihydroxyphenanthrene, 9,10-phenanthraquinone, 2,2'-diphenaldehyde, etc. Reactor unit 68 may also be utilized to halogenate the phenanthrene as by chlorination to form mono, di, tri, etc. chlorinated derivatives and bromination to produce mono, di, tri, etc. brominated derivatives. Nitration to form mono, di, tri, etc. nitrated derivatives, sulfonation to produce mono, di, tri, etc. sulfonated derivatives, and alkylation to produce mono, di, tri, etc. alkylated derivatives of phenanthrene may also be performed in reactor 68. The products of reactor 68 may be withdrawn through line 70. The phenanthrene may also be withdrawn through line 72 and valve 74 and added to the feed to carbon black reactor 76. The carbon black reactor 76 may utilize the light middle creosote oil passing through line 26, this material plus the phenanthrene from line 72 or this light material plus the heavy bottoms material from line 16. In carbon black reactor 76, the feed material is subjected to a temperature of about 1,300° to 3,500°F. to convert the same to carbon black. Oxygen is supplied through line 78 and a fuel gas to supply at least a portion of the heat to the unit is introduced through line 80. The amount of oxygen and fuel and their method of introduction are well known in the prior art. For example, the fuel gas is generally a natural gas, where such a gas is available, or it may be a liquid hydrocarbon and the oxygen may be supplied as air or oxygen or oxygen-rich air. As a practical matter, however, ordinary air is utilized. The air will be normally supplied in amounts of as much as 125 to 150% of the stoichiometric amount necessary for complete combustion of the hydrocarbon fuel. This air may be introduced with the combustible fuel gas and as a dispersant for the feed. Toward the end of the carbon black reactor, a water quench is introduced through line 82. Product gases containing entrained carbon black are recovered through line 84.

The feed material in accordance with the present invention includes a condensed-ring aromatic compound, selected from the group consisting of anthracene, derivatives of anthracene, fluorene, derivatives of fluorene, mixtures of these compounds with one another, and mixtures of these compounds with other materials. Examples of these materials include anthracene, benzanthracene, naphthacene, fluorene, etc. While the present invention is highly effective in the oxidation of the condensed-ring aromatic compounds of this invention to quinones and fluorenones, when these materials are in essentially their pure state, the most striking advantages of the present invention appear when hydrocarbon mixtures containing small amounts of these compounds, together with contaminating compounds, are treated. As indicated earlier, when compounds which are to be oxidized in accordance with the present invention are present in a crude mixture containing other compounds which also tend to oxidize, and, in fact, according to the prior art, oxidize more readily then the compounds of this invention, it has been found that the compounds of this invention are selectively oxidized while leaving substantially unaffected similar compounds, which the prior art indicates should oxidize more readily. Thus, the present invention is specifically applicable to crude hydrocarbon mixtures containing at least one percent of the condensed-ring aromatic materials of this invention, particularly coal liquids. Still more specifically, a suitable feed in accordance with the present invention is a middle oil fraction of coal liquids boiling between about 340° and 700°F. This middle oil fraction contains both fluorene and fluorene derivatives, as well as anthracene and anthracene derivatives. Preferably, the fluorene and fluorene derivatives and the anthracene or anthracene derivatives are oxidized separately and hence, the middle oil fraction should be distilled to split a fraction boiling from about 340° to 630°F., containing the fluorene and fluorene derivatives, and a fraction boiling from about 630° to 680°F., containing the anthracene and anthracene derivatives. In order to eliminate as much as possible of contaminating and interfering compounds from the fluorene fraction, still further fractionation may be carried out to recover a narrow boiling range material boiling from about 550° to 630°F. The fraction boiling between 630° and 680°F. and containing anthracene, also contains substantial quantities of contaminating and interfering compounds which are extremely difficult to separate from the anthracene but can be tolerated to some extent in the present process. Specifically, this fraction contains phenanthrene, which boils at the same boiling point as anthracene, and carbazole, which boils at 671°F. While it has been found, contrary to the teachings of the prior art, that large amounts of phenanthrene can be present along with the anthracene and will not be oxidized to any appreciable extent when carrying out the oxidation of anthracene, it has also been found that there appears to be a maximum quantity of carbazole which can be tolerated in the present process. More specifically, it has been found that the carbazole content of the reaction mixture should be reduced to less than about 10% of carbazole. In order to effect this reduction in the carbazole content, a fraction boiling between about 630° to 650°F should be recovered. However, it has also been found that larger quantities, up to about 20% of carbazole can be tolerated if slightly more catalyst is utilized. Since anthracene is by far the most important material commercially and since the chemistry of this compound and its oxidation product anthraquinone are best known, the remainder of this discussion will be directed primarily to the oxidation of anthracene and, particularly, crude mixtures of coal liquids containing anthracene.

A typical phenanthrene/anthracene heart-cut boiling between about 630° and 680°F had the following analysis:

Table I

| Component | % |
|---|---|
| <9,10–DHA | 0.1 |
| 9,10–DHA | 0.6 |
| X | 0.1 |
| X–Y | 0.2 |
| Y | 2.7 |
| P | 59.9 |
| A | 23.5 |
| A–C | 1.9 |
| C | 2.6 |
| >C | 8.4 | where:
9,10-DHA is 9,10-dihydroanthracene,
X and Y are unidentified components,
P is phenanthrene,
A is anthracene,
C is carbazole.

Another typical feed commercially available as a middle creosote oil and containing about 45% of combined phenanthrene and anthracene was also distilled. The resultant distillations of this product had the following heart-cut analysis:

Table II

| Component | % |
|---|---|
| <9,10–DHA | 0.4 |
| 9,10–DHA | 2.1 |
| X | 0.1 |
| X–Y | 0.2 |
| P | 2.6 |
| A | 71.0 |
| A–C | 16.8 |
| C | 2.2 |
| >C | 1.6 |
| | 2.5 |

The process of the present invention is conducted "in the liquid phase." In the present application, this phrase is meant to include a reaction mixture which is at least a pumpable slurry and therefore, which will include a true solution or a slurry as such. It is therefore not absolutely necessary that the anthracene be completely melted or dissolved in a reaction mixture. However, in order to maintain a liquid phase during the reaction, it is necessary to provide a solvent medium. It has also been found that this solvent medium must include an acid having a concentration of at least 90%. More specifically, it has been found that the acid must be present in a weight ratio of at least 1 weight unit of acid per weight unit of anthracene in the feed. The solvent medium, in accordance with the present invention, includes any suitable liquid, organic solvent which will remain liquid throughout the range of reaction temperatures and pressures employed herein. The solvent should, of course, be inert and thus not enter into the reaction itself. Suitable solvents include benzene, nitrobenzene, chlorobenzene, trichlorobenzene, chloroform, carbon tetrachloride, tertiary butylalcohol, etc. On other hand, aromatics with alkyl side chains should not be used because of the tendency for the alkyl groups to oxidize. Acids for use in accordance with the present invention include any mineral acid or lower carboxylic acid having from about 1 to 4 carbon atoms. The carboxylic acids are most useful in accordance with the present invention since the use of these acids, in sufficient quantities, will eliminate the necessity of an addition solvent. Specifically acids such as acetic, propionic and butyric acid, especially glacial acetic acid, may be used as the sole solvent medium to form the liquid phase in accordance with the present invention. Even though acids of high concentration are necessary, it has also been found that anhydrides, such as acetic anhydride, are not satisfactory. It is believed that the acid serves to solubilize the catalyst employed in accordance with the present invention and possibly acts as a catalyst "promoter."

Catalysts in accordance with the present invention include heavy metals having an atomic number less than about 84. Still more specifically, it has been found that a metal selected from the group consisting of manganese, cobalt, nickel, chromium, vanadium, molybdenum, tungsten, tin and cerium and mixtures of these are highly effective, particularly in the oxidation of anthracene to anthraquinone when contaminating materials, such as phenanthrene, are also present. The combination of manganese and cobalt has been found quite effective in the present reaction. The metal may be utilized in its elemental, combined or ionic form. Preferably, however, the metal is in the form of a salt, such as cobalt and/or manganese acetate. It has also been found that the addition of bromine to the catalyst system is also helpful and improves the present invention. The bromine may be added inits elemental, combined or ionic form. However, it is preferred that potassium bromide be employed.

The catalyst may be used in amounts between about 0.1 to 1.0% of the anthracene in the feed. The preferred catalysts are relatively inexpensive and do not appreciably affect the cost. Therefore, larger amounts may be employed since the reaction time appears to be reduced without affecting the product yield.

In addition to contacting the liquid phase hydrocarbon with the indicated catalysts, the reaction mixture is also blown with gases containing oxygen. The phrase "gases containing oxygen," when used herein, is meant to include any gaseous form of reactive oxygen. When an anthracene feed mixture containing substantial amounts of phenanthrene is employed, ozone cannot be utilized as a gaseous oxidant. However, ozone may be used where substantially pure anthracene or other pure materials are utilized. When a crude mixture containing anthracene and phenanthrene is treated, the oxygen must be utilized as molecular or diatomic oxygen, as distinguished from ozone or triatomic oxygen. The molecular oxygen may be supplied in a commercially pure form or in admixture with other gases which are inert to the process. For example, a suitable source of oxygen is atmospheric air or oxygen-enriched air.

The temperature utilized in accordance with the present invention appears to be a critical factor in carrying out the present process, at least to the extent that the feed material is maintained in a liquid phase. It has been found that a temperature between about ambient temperature and 400°F may be employed. Preferably, the temperature should be between 155° and 380°F and a temperature of 266°F is highly effective in the reaction. These temperatures have been found particularly effective in oxidizing anthracene to anthraquinone when present in crude mixtures of coal liquids. It has been found that oxidative decomposition of anthraquinone occurs at 285°F and higher and that carbazole and phenanthrene degrade at minimum temperatures of about 320°F and 338°F, respectively. Consequently, the optimum temperature of 266°F permits optimum oxygen uptake without degradation of components present.

The pressure employed, in accordance with the present invention, does not appear to be critical but should be sufficiently high to maintain the materials substantially all in their liquid phase throughout the reaction. When the "liquid phase" is referred to herein, it should be understood that this does not mean that all components must be in their liquid phase and no vapor phase can be present. It simply means that the vast majority of the reaction mixture is in the liquid phase and that the reaction is actually being carried out in the liquid phase mixture. Specifically, it has been found that a pressure from atmospheric to about 800 psig. may be utilized, and, preferably, a pressure below about 400 psig.

The following specific example illustrates a preferred embodiment of the present invention.

EXAMPLE 1

In the runs tabulated below, anthracene and synthetic blends of anthracene with phenanthrene and carbazole were used in order to eliminate ambiguities inherent in the use of crude mixtures. However, periodic checks were made with creosote oil cuts to assure applicability to such crude mixtures.

TABLE III

| Run No. | Feedstock | Weight, gms. | Catalysts | Weight, gms. | Wt. ratio catalysts/ anthracene | Temp., °F. | Pressure, p.s.i.g. | Air rate | Rxn. time, hrs. | Yield of AO, percent | Mls: of acetic acid |
|---|---|---|---|---|---|---|---|---|---|---|---|
| 1 | Anthracene / Phenanthrene | 6.0 / 4.0 | Co acetate / Mn acetate / KBr | | 9 lbs each/100 lbs | 250-300 | 400 | 350 cc./min | 5½ | 82 | 200 |
| 2 | Anthracene 96% | 5.0 | Same | | 2 lbs. each/100 lbs | 250-300 | 400 | do | 1 | 71 | 200 |
| 3 | do | 5.0 | do | | 1 lb. each/100 lbs | 250-300 | 400 | do | 1½ | 56 | 200 |
| 4 | do | 5.0 | do | | 0.2 lb. each/100 lbs | 250-300 | 400 | do | 5 | 60 | 200 |
| 5 | do | 5.0 | do | | 1.0 lb. each/100 lbs | 250-300 | 400 | do | 2 | 78 | 200 |
| 6 | do | 5.0 | do | | do | 250-300 | 100 | do | 6½ | 11 | 200 |
| 7 | do | 5.0 | do | | do | 250-300 | 200 | do | 3 | 72 | 200 |
| 8 | Anthracene / Carbazole | 5.0 / 1.0 | do | | do | 250-300 | 200 | do | 3½ | 54 | 200 |
| 9 | Anthracene / Phenanthrene | 6.0 / 24.0 | do | | 2.5 lbs. each/100 lbs | 250-300 | 400 | do | 8 | 73 | 150 |
| 10 | Anthracene / Phenanthrene | 10.0 / 40.0 | do | | 2.0 lbs. each/100 lbs | 302 | 400 | 2.7 ft.³ hr | 3 | 64 | 500 |
| 11 | Anthracene / Phenanthrene | 50.0 / 50.0 | do | | 0.4 lb. each/100 lbs | 302 | 400 | 3.9 ft.³ hr | 3¾ | 41 | 500 |
| 12 | Anthracene / Phenanthrene | 50.0 / 50.0 | do | | do | 302 | 400 | 3.6 ft.³ hr | 3 | 56 | 500 |
| 13 | Anthracene / Phenanthrene | 50.0 / 50.0 | do | | 0.4 lb. each/100 lbs | 342 | 400 | 5.25 ft.³/hr | 3 | 69 | 500 |
| 14 | Anthracene / Phenanthrene | 50.0 / 50.0 | do | | do | 302 | 220 | 5.4 ft.³/hr | 3.6 | 42 | 500 |
| 15 | Anthracene / Phenanthrene | 50.0 / 50.0 | do | | do | 302 | 400 | 5.8 ft.³/hr | 2.5 | 27 | 500 |
| 16 | Anthracene / Phenanthrene | 100 / 400 | Mn acetate | | 0.2 lb. each/100 lbs | 302 | 400 | 4.8 ft.³/hr | 4 | 70 | 60 |
| 17 | Anthracene / Phenanthrene | 100 / 400 | do | | do | 302 | 400 | 6.5 ft.³/hr | 4.4 | 48 | 50 |
| 18 | Anthracene / Phenanthrene | 100 / 400 | do | | do | 302 | 400 | 4.6 ft.³/hr | 4.8 | 54 | 75 |
| 19 | Anthracene / Phenanthrene | 100 / 400 | do | | do | 302 | 400 | 6.2 ft³./hr | 4.2 | 36 | 50 |
| 20 | Anthracene / Benzene | 100 / 400 | do | | do | 302 | 400 | 5.2 ft.³/hr | 6.4 | 52 | 50 |
| 21 | Anthracene / Benzene | (1) / (1) | do | | do | 302 | 400 | {5.2 ft.³/ hr / 4.8 ft.³/hr.} | {2 / 12.9} | 62 | 150 |
| 22 | Anthracene / Phenanthrene | 6.0 / 4.0 | Co acetate / Mn acetate / KBr | 0.9 / 0.9 / 0.9 | 9 lbs/100 lbs / 9 lbs/100 lbs / 6 lbs/100 lbs | 200-300 | 400 | 350 cc/min | 5½ | 82 | 200 |
| 23 | Anthracene 96% | 5.0 | same | 0.1 | 2 lbs/100 lbs. each | 250-300 | 400 | 350 cc/min | 1 | 71 | 200 |
| 24 | do | 5.0 | do | 0.05 ea. | 1 lb/100 lbs. each | 250-300 | 400 | 350 cc/min | 2 | 78 | 200 |
| 25 | do | 5.0 | do | 0.05 ea. | 1 lb/100 lbs. each | 250-300 | 200 | 350 cc/min | 3 | 72 | 200 |
| 26 | Anthracene / Phenanthrene | 6.0 / 24.0 | do | 0.15 ea. | 2.5 lb/100 lbs. each | 250-300 | 400 | 350 cc/min | 8 | 73 | 150 |
| 27 | Anthracene / Phenanthrene | 50.0 / 50.0 | do | 0.2 ea. | 0.4 lb/100 lbs. each | 342 | 400 | 5.25 ft.³/hr | 3 | 69 | 500 |
| 28 | Anthracene / Phenanthrene | 100 / 400 | Mn acetate | 0.2 | 0.2 lb/100 lbs | 302 | 400 | 4.9 ft.³/hr | 4 | 70 | 60 |
| 29 | Anthracene / Benzene | 100 / (1) | do | 0.2 | 0.2 lb/100 lbs | 302 | 400 | {5.2 / 4.8} | {2 / 13} | 62 | 100 |
| 30 | Anthracene / Carbazole | 5.0 / 1.0 | Co acetate / Mn acetate / KBr | 0.05 ea. | 1 lb/100 lbs. each | 250-300 | 200 | 350 cc/min | 3½ | 54 | 200 |

¹ 400 milliliters.

The following examples illustrate the application of the process to crude creosote oil fractions.

EXAMPLE 2

A crude middle oil fraction of coal tar was vacuum distilled to obtain a fraction boiling between about 630° and 650°F and containing less than about 10% carbazole. 400 parts of this material were mixed with 50 parts of 95% acetic acid and a catalyst containing manganese acetate, cobalt acetate and potassium bromide was added to form a slurry. The slurry was agitated and blown with air while maintaining a temperature of about 302°F at a pressure of about 300 psig. 65% of the anthracene was oxidized to anthraquinone.

EXAMPLE 3

A crude middle oil fraction of coal tar was vacuum distilled to obtain a fraction boiling between about 630° and 650°F and containing less than about 10% carbazole. 250 parts of this material were mixed with 150 parts of 95% acetic acid and a catalyst containing manganese acetate, cobalt acetate and potassium bromide was added to form a slurry. The slurry was agitated and blown with air while maintaining a temperature of about 320°F at a pressure of about 400 psig. 70% of the anthracene was oxidized to anthraquinone.

EXAMPLE 4

Additional tests of creosote oil fractions are summarized in Table IV.

Table IV

| Run No. | Temp. | % AQ in Dist. Ovhd. | Theoretical % AQ | Yield |
|---|---|---|---|---|
| 1-236-47-B | 150°C | 19.3% | 27.5% | 70.3% |
| 1-236-48-A* | 150° C | 14.5% | 27.5% | 52.7% |
| 1-236-49-A | 175° C | 15.7% | 27.0% | 58.2% |
| 1-236-49-B | 175° C | 15.5% | 27.0% | 57.4% |

*Run 48-A was discontinued because of a mechanical malfunction and restarted the next day after repairs were made.

The above runs were made on creosote oil fractions. The feedstock for Runs 47-B and 48-A had the following analysis:

| >9,10 | 9,10 DHA | X | X-Y | Y | P | A | A-C | C | >C |
|---|---|---|---|---|---|---|---|---|---|
| 0.1% | 0.6% | 0.1% | 0.2% | 2.7% | 59.9% | 23.5% | 1.9% | 2.6% | 8.4% |

The feedstock for Runs 49-A and 49-B had the following analysis:

| >9,10 | 9,10 DHA | X | X-Y | Y | P | A | A-C | C | C |
|---|---|---|---|---|---|---|---|---|---|
| 0.1% | 0.4% | 0.2% | 0.2% | 2.7% | 58.0% | 23.1% | 2.3% | 3.0% | 10.0% | where:
9,10 DHA is 9,10 dihydroanthracene
X and Y are unknown constituents
P is phenanthrene
A is anthracene
C is carbazole.

The following example illustrates the oxidation of fluorene pursuant to the present invention.

EXAMPLE 5

100 parts of fluorene were mixed with 500 parts of 95% acetic acid and a catalyst containing manganese acetate, cobalt acetate and potassium bromide was added to form a solution. The solution was agitated and blown with air while maintaining a temperature of about 348°F at a pressure of about 400 psig. At least 50% of the fluorene was oxidized to fluorenone.

The use of catalysts other than cobalt and manganese are illustrated below.

EXAMPLE 6

50 parts of anthracene were mixed with 600 parts of glacial acetic acid and a catalyst containing stannous chloride and potassium bromide to form a solution. The solution was agitated and blown with air while maintaining a temperature of about 265°F at a pressure of about 400 psig. 67% of the anthracene was oxidized to anthraquinone.

EXAMPLE 7

50 parts of anthracene were mixed with 600 parts of glacial acetic acid and a catalyst containing cerous chloride and potassium bromide to form a solution. The solution was agitated and blown with the air while maintaining a temperature of about 265°F at a pressure of about 400 psig. 87% of the anthracene was oxidized to anthraquinone.

EXAMPLE 8

A mixture of 100 parts of anthracene and 400 parts of phenanthrene were mixed with 60 parts of glacial acetic acid and a catalyst comprising manganous acetate at a temperature of 300°F and a pressure of 400 psig. A 70% yield of anthraquinone was obtained.

EXAMPLE 9

50 parts of anthracene were mixed with 600 parts of glacial acetic acid and a catalyst comprising nickelous acetate and potassium bromide to form a solution at a temperature of about 265°F and a pressure of 400 psig. A yield of 87% anthraquinone was obtained.

We claim:
1. A method for producing anthraquinone from a mixture of aromatic hydrocarbons boiling between about 630°F and about 680°F and consisting essentially of phenanthrene and anthracene comprising:
   a. oxidizing with molecular oxygen the anthracene in said hydrocarbon mixture to anthraquinone by contacting said hydrocarbon mixture with a molecular oxygen-containing gas and a catalyst consisting essentially of manganese acetate, cobalt acetate or a combination of manganese acetate and cobalt acetate, and optionally a bromine compound selected from the group consisting of bromine and potassium bromide;
   b. while maintaining the reaction mixture in a liquid phase by adding thereto a solvent medium, at least a part of which is an acid selected from the group consisting of mineral acids and lower carboxylic acids wherein at least one part by weight of said acid per part of anthracene in the mixture of aromatic hydrocarbons is utilized;
   c. while maintaining a temperature between about 155°F and about 380°F and a pressure between about atmospheric and about 800 psig, said temperature and pressure being mutually adjusted to maintain said reaction mixture in a liquid phase and;

d. separating anthraquinone from the reaction product formed.

2. A method in accordance with claim 1 wherein said mixture of aromatic hydrocarbons has a boiling point between about 630° to about 650°F.

3. A method in accordance with claim 1 wherein said catalyst consists essentially of manganese acetate and cobalt acetate.

4. A method in accordance with claim 1 wherein the catalyst also includes a bromine compound selected from the groups consisting of bromine and potassium bromide.

5. A method in accordance with claim 1 wherein the catalyst consists essentially of manganese acetate, cobalt acetate and potassium bromide.

6. A method in accordance with claim 1 wherein the catalyst is present in an amount between about 0.1 and about 1% by weight based on the anthracene content of the aromatic hydrocarbon mixture.

7. A method in accordance with claim 1 wherein the acid is acetic acid.

8. A method in accordance with claim 1 wherein the oxidizing agent is air.

9. A method for producing anthraquinone from a mixture of aromatic hydrocarbons boiling between about 630°F and 680°F and consisting essentially of phenanthrene, anthracene, and carbazole in an amount less than about 20% by volume of the total mixture, comprising:

a. oxidizing with molecular oxygen the anthracene in said hydrocarbon mixture to anthraquinone by contacting said hydrocarbon mixture with a molecular oxygen-containing gas and a catalyst consisting essentially of maganese acetate, cobalt acetate or a combination of manganese acetate and cobalt acetate, and optionally a bromine compound selected from the group consisting of bromine and potassium bromide;

b. while maintaining the reaction mixture in a liquid phase by adding thereto a solvent medium, at least a part of which is an acid selected from the group consisting of mineral acids and lower carboxylic acids wherein at least one part by weight of said acid per part of anthracene in the mixture of aromatic hydrocarbons is utilized;

c. while maintaining a temperature between about 155°F and about 380°F and a pressure between about atmospheric and about 800 psig, said temperature and pressure being mutually adjusted to maintain said reaction mixture in a liquid phase and;

d. separating anthraquinone from the reaction product formed.

* * * * *

UNITED STATES PATENT OFFICE
CERTIFICATE OF CORRECTION

PATENT NO. : 3,855,252
DATED : December 17, 1974
INVENTOR(S) : Kenneth R. Robinson and Joseph E. Willis It is certified that error appears in the above-identified patent and that said Letters Patent are hereby corrected as shown below:

Column 9, Table III, Run No. 20, opposite "Benzene" delete "400" and insert --($^1$)--.

Column 9, Run No. 21, opposite "Anthracene" delete "($^1$)" and insert --100--.

Columns 9 and 10, Table III after Run No. 30 add:

Table III

| Run No. | Feedstock | Weight | Catalysts | Weight | Wt. Ratio Catalysts Anthracene | Temp. | Pressure | Air Rate | Rxn. Time | Yield of AQ | Mls. of Acetic Acid |
|---|---|---|---|---|---|---|---|---|---|---|---|
| 31 | Anthracene Phenanthrene | 50 gms. 200 gms. | Co acetate Mn acetate KBr | 1.0 gm. ea. | ---- | 252°F | 400 psig. | ---- | ---- | 76.1% | 600 |
| 32 | " | " | " | " | ---- | " | " | ---- | ---- | 79.3% | 600 |
| 33 | " | " | " | " | ---- | " | 200 psig. | ---- | ---- | 61.8% | 600 |
| 34 | " | " | " | " | ---- | " | 800 psig. | ---- | ---- | 56.8% | 600 |
| 35 | " | " | " | " | ---- | " | " | ---- | ---- | 61.8% | 600 |
| 36 | " | " | " | " | ---- | " | 400 psig. | ---- | ---- | 78.6% | 600 |

Columns 11 and 12, line 52, delete "C" appearing over 10.0% and substitute -->C--.

Signed and Sealed this twentieth Day of April 1976

[SEAL]

Attest:

RUTH C. MASON
Attesting Officer

C. MARSHALL DANN
Commissioner of Patents and Trademarks